United States Patent [19]
Tecza

[11] Patent Number: 5,361,722
[45] Date of Patent: Nov. 8, 1994

[54] MILKING FACILITY WITH SERVICE ALLEY

[75] Inventor: Joe Tecza, Platte City, Mo.

[73] Assignee: Universal Dairy Equipment Inc., Kansas City, Mo.

[21] Appl. No.: 78,143

[22] Filed: Jun. 16, 1993

[51] Int. Cl.⁵ ............................................. A01J 5/00
[52] U.S. Cl. ................................................. 119/14.03
[58] Field of Search ............... 119/14.01, 14.02, 14.03, 119/14.04, 27

[56] References Cited

U.S. PATENT DOCUMENTS

| | | |
|---|---|---|
| 1,798,413 | 3/1931 | Graves . |
| 1,977,511 | 10/1934 | Graves . |
| 2,358,000 | 9/1944 | Cornell . |
| 2,472,122 | 6/1949 | Polivka . |
| 2,512,094 | 6/1950 | Duncan . |
| 2,617,382 | 11/1952 | Duncan . |
| 2,617,383 | 11/1952 | Duncan .......................... 119/14.03 |
| 2,674,979 | 4/1954 | Merritt et al. . |
| 2,740,377 | 4/1956 | Duncan . |
| 2,742,876 | 4/1956 | Duncan .......................... 119/14.03 |
| 2,910,965 | 11/1959 | Cann, Sr. . |
| 3,053,225 | 9/1962 | Babson . |
| 3,100,475 | 8/1963 | Edge . |
| 3,261,323 | 7/1966 | Steelhammer .................. 119/14.04 |
| 3,566,841 | 3/1971 | Gerrish et al. . |
| 3,703,884 | 11/1972 | Maddalena et al. . |
| 3,709,196 | 1/1973 | Hicks . |
| 3,762,370 | 10/1973 | Gulleson . |
| 3,810,442 | 5/1974 | Jacobs et al. . |
| 4,000,718 | 1/1977 | Brown . |
| 4,006,712 | 2/1977 | Peel ................................. 119/14.03 |
| 4,207,837 | 6/1980 | Schwartau et al. . |
| 4,355,595 | 10/1982 | Ackerman et al. .............. 119/14.03 |
| 4,386,581 | 6/1983 | Rokhvarg . |
| 4,401,055 | 8/1983 | Street et al. ...................... 119/14.03 |
| 4,452,175 | 6/1984 | Thompson et al. . |
| 4,513,687 | 4/1985 | De Jong . |
| 4,763,605 | 8/1988 | Braum ............................. 119/14.03 |
| 4,977,856 | 12/1990 | Norwood . |

Primary Examiner—Gene Mancene
Assistant Examiner—Thomas Price
Attorney, Agent, or Firm—Hovey, Williams, Timmons & Collins

[57] ABSTRACT

A facility for use in handling dairy animals is provided which includes a service alley which is located below a platform on which the cow or other dairy animal stands during milking. A floor is located adjacent the platform and the service alley and defines an operator area where the herdsman can tend the milking equipment to be attached to the animal. Advantageously, the bulk of the electronic equipment and other milking apparatus is located in the service alley and thus environmentally isolated from the exposed area where the cows are milked. Parallel rows of platforms and service alleys are preferably provided, separated by a common operator area, and the service alleys may be joined to a common equipment room housing milk receivers, coolers, and the like. The service alley is preferably supplied with ventilation through subterranean ducts which provides air at moderated temperatures.

15 Claims, 5 Drawing Sheets

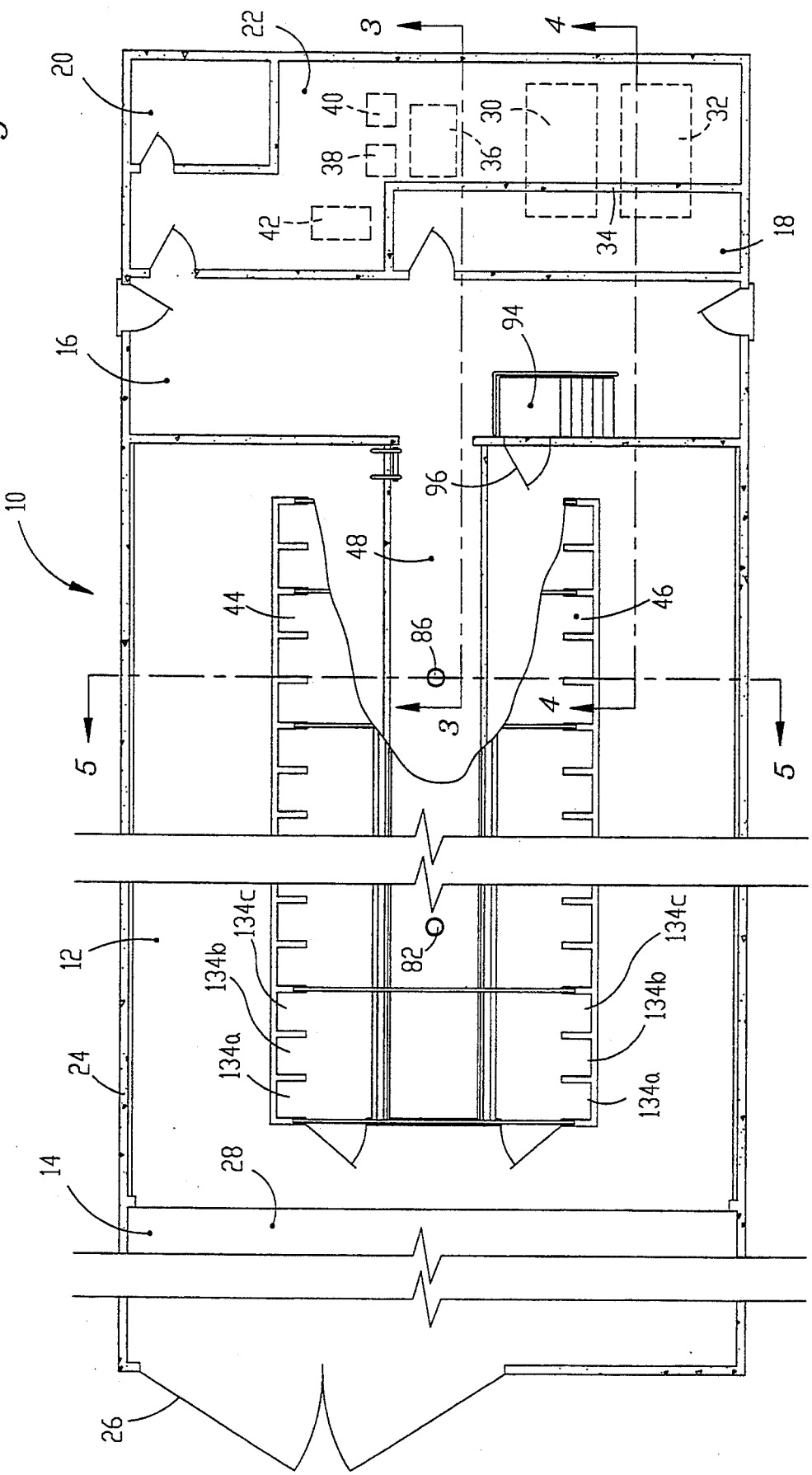

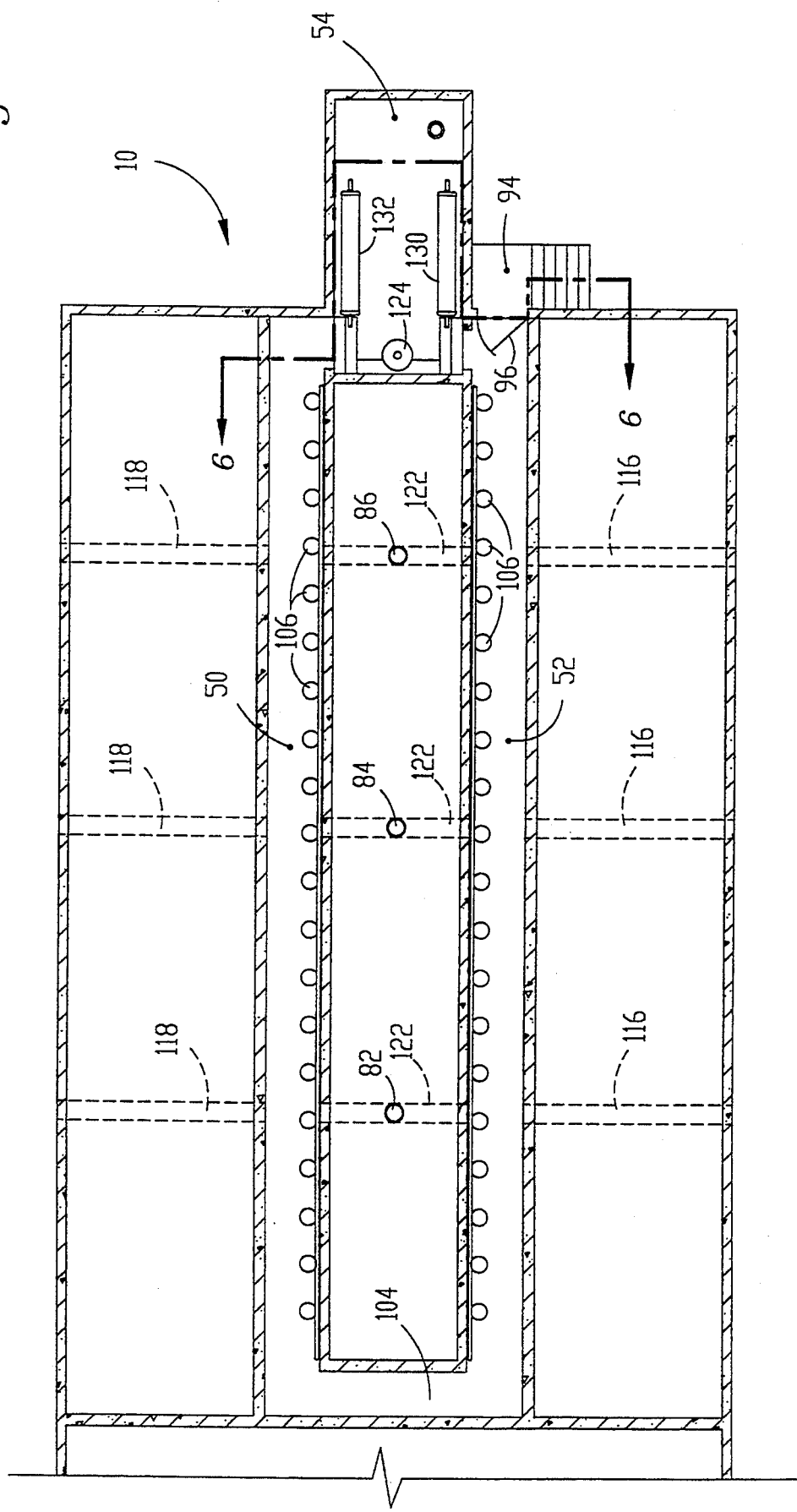

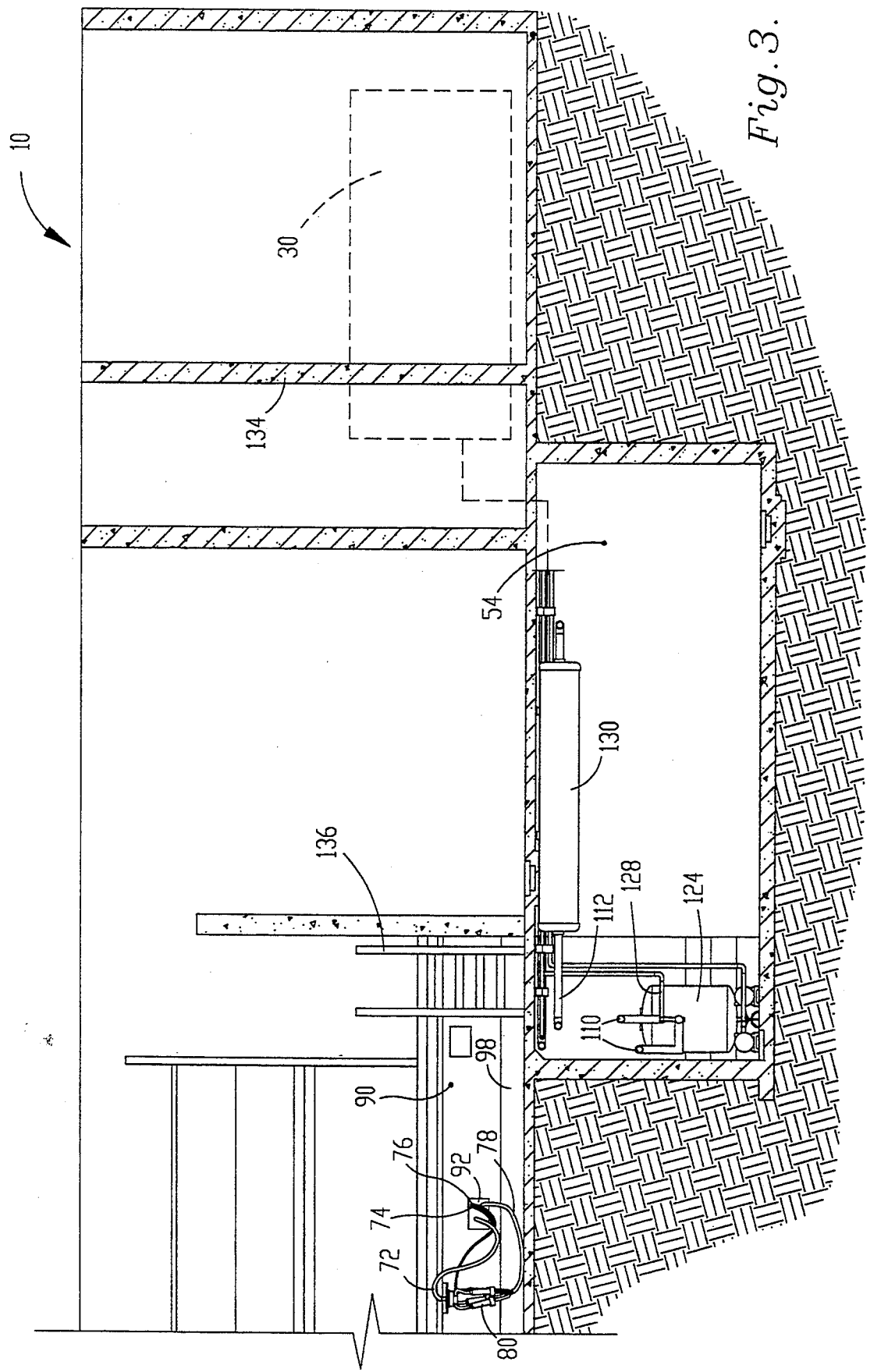

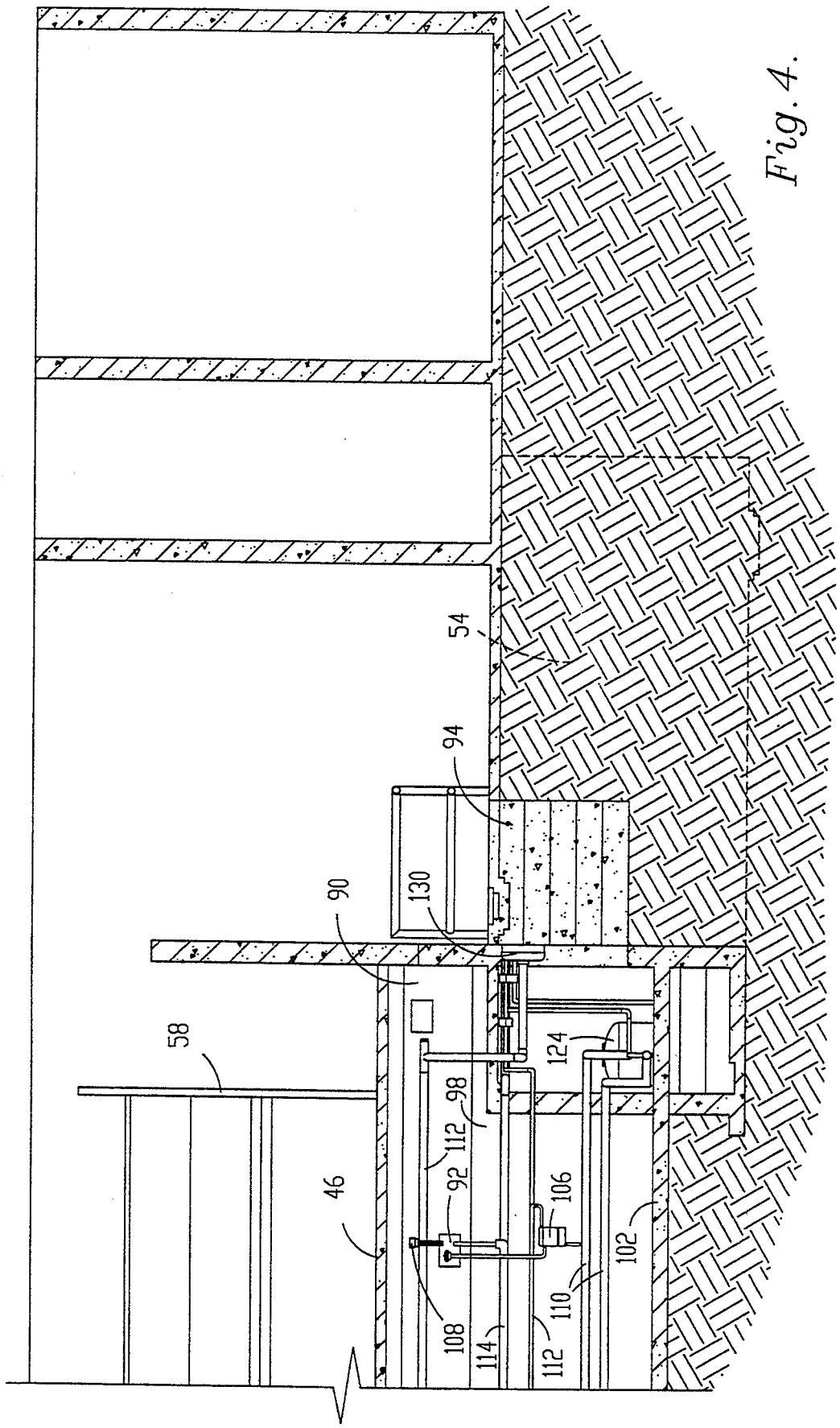

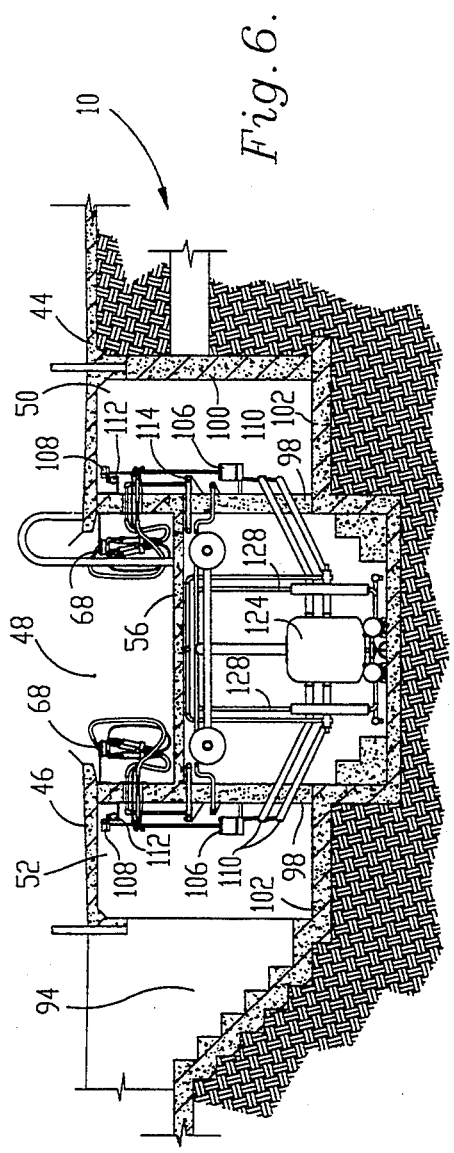
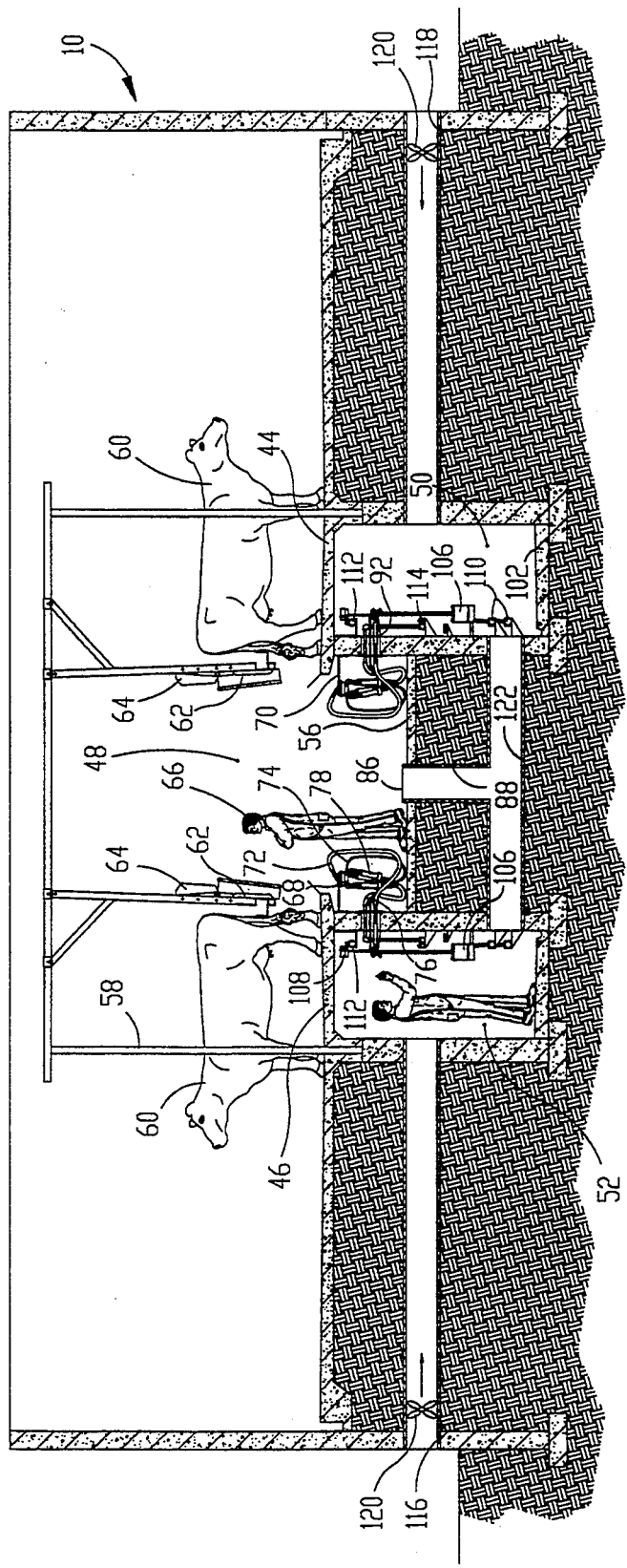

MILKING FACILITY WITH SERVICE ALLEY

BACKGROUND OF THE INVENTION

1. Field of the Invention

This invention broadly concerns a building which serves as a milking facility and includes three separate areas for accommodating a dairy animal, a herdsman or operator, and a service alley for access to milk receivers and other equipment requiring operator access. Advantageously, the dairy animal area or platform is positioned immediately above the service alley to isolate the milk receiver from the animals.

2. Description of the Prior Art

In a typical modern milking parlor, cows enter the parlor area and are positioned in side-by-side relationship in either a perpendicular or so-called herringbone pattern. The cows are located at one higher elevation, and the operators are located at a second, lower elevation in an operator area or "pit". The operators are free to move along the pit to service the animals during milking by attaching or removing the teat claws and performing other maintenance operations.

The operators, also known as herdsmen, must also attend to a variety of milk transfer equipment, much of it including a good deal of electronics. For example, the milk weigh meters are typically located in the pit, as are clean-in-place units, milk lines, vacuum lines, and pulsation lines. Other equipment may often be located in the pit. Unfortunately, this exposes the equipment to the cows, manure, urine, flies and other disease carriers as well as high or low ambient temperatures according to the local environment. This equipment must be not only cleaned and maintained, but also avoided when the herdsman is tending the cows.

SUMMARY OF THE INVENTION

These problems are largely solved by the milking facility in accordance with the present invention. That is to say, the present invention positions a great deal of the milking equipment in an environmentally isolated location away from both the dairy animal and the herdsman. This is accomplished by providing a service alley located beneath the platform supporting the animal and also adjacent the operator pit. The milking facility hereof is thus environmentally more secure, more productive in that more animals can be handled in a shorter length of time, easier to operate, and has the additional advantage that milking is assisted by gravity as the milk moves through the milk conduits to a lower elevation in the service alley.

In greater detail, the present invention includes an animal-supporting platform, a floor adjacent to and at a lower elevation than the platform defining an operator area, and a service alley positioned beneath the platform and adjacent to the operator area. Preferably, the platform and service alley are elongated, and two opposing platforms and service alleys are separated by a common operator area. The service alleys are separated from the operator areas by a partition, which may include a coupling so that conduit carrying milk from the animal may convey the milk through the partition to a piping system carrying the milk to a milk receiver located in the service alley. The service alley may include a separate equipment area also located below the platform level for cooling and storing milk for subsequent bulk transport.

BRIEF DESCRIPTION OF THE DRAWINGS

FIG. 1 is a fragmentary top plan view of a milking parlor in accordance with the present invention, with some of the milking stalls broken away to show the parlor platform;

FIG. 2 is a horizontal cross-sectional view showing the operator area, service alleys and adjoining equipment room of the milking parlor hereof;

FIG. 3 is an enlarged, fragmentary vertical sectional view taken along line 3—3 of FIG. 1, showing the platform, operator area and equipment room;

FIG. 4 is an enlarged, fragmentary vertical sectional view taken along line 4—4 of FIG. 1, showing the service alley and animal platform, with the equipment room shown in phantom;

FIG. 5 is an enlarged, vertical cross-sectional view taken along line 5—5 of FIG. 1, showing the relative locations of the animal on the platform, the operator in the operator area, and another operator in the service alley; and FIG. 6 is a vertical cross-sectional view taken along line 6—6 of FIG. 2, showing the relative levels of the platform, operator area, service alley, and adjoining equipment room.

DESCRIPTION OF THE PREFERRED EMBODIMENT

Referring now to the drawing, a milking facility 10 is shown in FIG. 1 and broadly includes a milking parlor 12, an animal holding area 14, a breezeway 16, a tank room 18, an office 20, and a workroom 22. The milking facility 10 is a building preferably under a common roof for each of the aforesaid areas, although such is not necessary. Moreover, while the following description and the drawings are addressed to a facility for milking cows, it is to be understood that the facility can readily be scaled for other dairy animals. Additionally, the length of the milking facility is largely dependent on the number of animals to be milked, and FIG. 1 has been foreshortened in the areas of the milking parlor 12 and the holding area 14 for convenience in viewing the drawing.

The entire facility 10 includes a concrete foundation wall 24 and is provided with a large double-door 26 leading to the holding area 14. The holding area 14 includes a sloped deck 28 for ease in washing a removing accumulated manure. The workroom 22 may be provided with an overhead door at the end of the facility 10 opposite double-door 26 and may house milk tanks 30 and 32 which pass through a wall 34 separating the workroom 22 from the tank room 18. Additionally, the workroom 22 may house a chiller unit 36, refrigerators 38 and 40, and vacuum pump 42.

The milking parlor 12 includes first and second animal-supporting platform 44 and 46, an operator area or pit 48, service alleys 50 and 52, and equipment room 54, the latter two areas being visible in FIG. 2. The platforms 44 and 46 are is elevated relative to the floor 56 of the pit 46, whereby the platforms 44 and 46 are at the same level as the uppermost end of the deck 28 so that the cows may walk onto the platforms therefrom. The floor 56 is at the same level as the floor of the breezeway 16, and lower in elevation relative to the platforms 44 and 46, as is more readily shown in FIG. 5.

The platforms 44 and 46 of the milking parlor 12 support stall-defining means 58 for positioning the cows 60 in side-by-side relationship along a single platform 44 or 46 during milking. The stall-defining means 58 may include a butt-pan 62 along each of the platforms for receiving or deflecting manure and urine defecated by the cows 60 during milking, although inevitably some excrement invades the pit 48. The stall-defining means may also carry an automatic take-off controller 64 or other devices which must be within ready reach of the operator or herdsman 66 during milking. The platforms 44 and 46 are elongated as shown in FIG. 1, and in fact may be of virtually any length desired according to the capacity of the facility 10.

Within the pit 48, a milk claw 68 is supported on a hanger 70 in position for access to the herdsman 66 and for attachment to the udder of the cow 60. Each claw includes a milk conduit 72, pulsation conduits 74 and 76, and a clean-in-place (CIP) conduit 78 for conveying a CIP cleaner to the teat cups 80 and through the claw 68. Ventilation outlets 82, 84 and 86 are connected to respective ventilation stacks 88 for ventilating the pit 48 as will subsequently be explained.

The pit 48 is environmentally isolated from the service alleys 50 and 52 by a partition 90, which is preferably of nylon, Delrin, or other friction-resistant synthetic resin which is easy to clean. Thus, the area of the pit is defined largely by the floor 56, the location of the opposing partitions 90 respective to each platform 44 and 46, and the length of the platforms. A plurality of couplers 92 are provided; one coupler for each milk claw 68 and thus each cow 60 to be milked at a time. The couplers 92 extend through the partition and provide fittings for receiving and attaching the milk conduit 72, pulsation conduits 74 and 76, and CIP conduit 78 thereon.

Access to the service alleys 50 and 52 from breezeway 16 is gained by a stairwell 94 leading to door 96. The service alleys 50 and 52 are defined by interior walls 98 and exterior walls 100, as well as basement floor 102. The ceiling of each service alley 50 and 52 is the respective platform located thereabove. The length of the service alleys 50 and 56 correspond to the respective platforms 44 and 46 located thereabove. As shown in FIG. 5, the interior dimensions of the service alleys 50 and 52 are sufficient to permit an operator to comfortably move therealong for servicing the equipment therewithin. The service alleys 50 and 52 are joined by a connecting passageway 104 at one end thereof and the equipment room 54 at the end adjacent the stairwell 94. As may be seen in FIGS. 2, 3, 4 and 6, the equipment room 54 has a floor which is two steps lower than the basement floor 102 of the service alleys.

Housed within the service alleys 50 and 52 are milk weigh meters 106 for measuring the weight of milk given by each cow. Pulsators 108 connected to pulsation conduits 74 and 76 which supply varying pulsation to the teat claw are also housed in the service alleys 50 and 52. The service alleys also include milk lines 110 for receiving a flow of milk passing through the coupler 92 from the milk conduit and then to the milk weigh meter 106, vacuum lines 112 for supplying vacuum to the pulsation conduits 74 and 76 and to the milk claw through the milk conduits, and CIP lines 114 for carrying and receiving flows of CIP cleaner to the claws 68 via the couplers 92.

The service alley 50 is provided with ventilation from the outside by three underground ducts 116 and similarly service alley 52 is ventilated by three underground ducts 118. Each duct 116 or 118 is fluidically coupled to a fan 120 to force air into the service alley. Also, for purposes of climate control, the ducts 116 and 118 may be fluidically coupled to air heating means or air cooling and dehumidifying means, depending on the desire for such additional environmental controls in the particular climate. After the ventilation air has entered the service alleys 50 and 52, it further circulates to underground transfer ducts 122 which connect at a T junction with ventilation stacks 88 to supply air to the pit 48 through the ventilation outlets 82, 84 and 86.

The milk lines 110 lead to milk receiver 124 which is located in the equipment room 54 and lower in elevation than both the weigh meters 106 and the milk claw 68, as shown in FIG. 6. The equipment room 54 is positioned beneath the breezeway 16, which as noted earlier has a floor at the same elevation as the floor 56 of the pit 48. The milk receiver 124 is provided with suitable pumping equipment 126 to transfer the milk received therein to transfer pipes 128 for subsequent chilling and storage by chiller unit 36 and storage tanks 30 and 32. The equipment room also houses vacuum reserve tanks 130 and 132 which store vacuum generated by vacuum pump 42. A small opening is defined in the floor of the breezeway for routing the plumbing which includes piping connecting the milk receiver 124 with the chiller and storage tanks, the vacuum storage tanks with the vacuum pump, and electrical conduit and data communication cables. One skilled in the art will appreciate the routing of the pipes, electrical conduit and communication cables to the respective mechanical components.

In use, the cows 60 are lead from the holding area 14 into the milking parlor 12, and more specifically to the platforms 44 and 46, where they are turned into a suitable side-by-side position for milking. The manner of positioning the cows on the platform will vary according to the particular stall used, e.g. a "herringbone", "abreast", or other arrangement. In the drawing, the cows 60 are depicted in an abreast arrangement in individual, side-by-side milking stalls 134a, 134b, 134c, etc. After the cows 60 are in position, the operator or herdsman 66 disconnect the CIP conduit from the teat cups 80 and attaches the teat cups 80 to the cows teats for initiating the milking sequence begins. Milking may be conducted at a lower vacuum, e.g. 12 inches Hg, and therefore with lower equipment cost, less noise, and possibly less teat damage, because gravity aids in conveying the milk "downhill" to the receiving tank.

As the milk passes from the milk claw 68, it moves through the milk conduit 72, through the couplers 92, and into the milk weigh meters 106 which are advantageously located in the service alleys 50 and 52. The milk given by each cow 60 is weighed by the weigh meters 106 and then received by the milk lines 110 and flows into the milk receiver 124. As may be seen by FIG. 5, the dimensions of the service alleys 50 and 56 are large enough to permit an operator 66 to easily move therethrough to maintain and clean the equipment therein. For example, the height between the top of the basement floor 102 and the bottom of the platform 54 or 56 is preferably about 6 to 8 feet high and preferably at least 4 feet wide. The milk receiver 124, which may be of any capacity but for a large facility would be in the range of 55 gallons, accumulates the milk from the milk lines 110 and then pumping equipment, which may be respectively 1 and 2 hp pumps, may pump the milk into the chiller 36 and then into the storage tanks 30 and 32 for subsequent transfer to a dairy processing plant. The arrangement allows the smaller pump to run substantially constantly while the larger pump operates only when the milk in the receiver rises to a predetermined level. The vacuum pump 42 and the vacuum reserve tanks 130 ensure that a proper vacuum level is maintained in the milk conduit and available to the pulsators 108 for intermittent supply to the pulsation conduits 74 and 76. After the milking phase has finished, the cows 60 are led out of the milking parlor and out through the holding area. The milk claws 68 and their associated teat cups may be sanitized by reattaching the CIP conduit 78 and introducing a supply of cleaner through the CIP conduit 78. The equipment is then ready for a second group of cows to move into the milking parlor 12. The herdsman 66 may easily gain access to the platforms 44 and 46 from the pit area by ladders 136, and from the pit 48 to the service alleys 50 and 52 by the stairwell 94. Thus, access to the various levels presents no inconvenience during the milking operation.

It may be appreciated that the present milking facility 10 enjoys substantial advantages over the prior art. It is quieter in the pit 48 because the pumping equipment 126 is located beneath the ground in the equipment room 54. The pit 48 is much easier to work in and clean because the piping has been located in the service alleys. Advantageously, the service alleys are at least partially underground and thus cooler in hot climates and warmer in frigid climates. The milk weigh meters 106 and other associated equipment are environmentally removed from the defecation and flies associated therewith, and thus drier and easier to clean and maintain. Further, the service alleys 50 and 52 are not only supplied with ventilation and may be heated, cooled or dehumidified, if desired, but supply the pit 48 with ventilation through underground ducts which keeps the pit area 48 more habitable for the herdsman.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the liberal scope of the invention as set out in the following claims.

We claim:

1. A milking facility for servicing dairy animals to be milked comprising:
    a fixed animal-supporting platform at a first, uppermost level;
    a fixed floor adjacent to said animal-supporting platform positioned at a second, relatively lower level, said floor defining an operator area for access to animals supported by said platform;
    milking apparatus including at least one conduit means for conveying milk from a dairy animal supported on said platform to a remote milk receptacle; and
    structure defining a service alley adjacent to said floor and positioned beneath and below said platform and below said floor, said service alley having interior dimensions sufficient to permit an operator to move therealong; said service alley including a partition for environmentally isolating said floor from said service alley, said partition including means for providing access for passage of milk carried by said conduit means through said partition into said service alley.

2. A milking facility as set forth in claim 1, including an entry to said service alley separate from said operator area.

3. A milking facility as set forth in claim 1, wherein said platform is elongated for receiving a plurality of dairy animals in side-by-side relationship therealong, and said service alley extends beneath and substantially the entire length of said platform.

4. A milking facility as set forth in claim 1 including a second animal-supporting platform positioned opposite said animal-supporting platform including a second service alley positioned beneath said second animal-supporting platform, said operator area being located intermediate said animal-supporting platform and said second animal-supporting platform.

5. A milking facility as set forth in claim 1, wherein said milk receptacle is positioned within said service alley at a lower elevation than said dairy animal.

6. A milking facility as set forth in claim 5, wherein said milk receptacle comprises a weigh meter.

7. A milking facility as set forth in claim 1, including a portal having a door for limiting environmental access to said service alley.

8. A milking facility as set forth in claim 1, including means for supplying a flow of air into said service alley.

9. A milking facility as set forth in claim 8, wherein said flow of air passes through a subterranean air duct.

10. A milking facility as set forth in claim 9, wherein said air is further routed from said service alley to a duct venting to said operator area.

11. A milking facility as set forth in claim 1, wherein said access-providing means includes a coupler for fluidically connecting to said conduit means.

12. A milking facility as set forth in claim 1, including a milk receiver positioned in said service alley and fluidically connected to said conduit means.

13. A milking facility for servicing dairy animals to be milked comprising:
    a first animal-supporting level;
    a second relatively lower level adjacent said first level for access by an operator servicing animals during milking;
    a third level positioned beneath said first level and adjacent to and relatively lower than said second level having dimensions for allowing an operator to walk therethrough; and
    structure for environmentally isolating said third level from said first level and said second level during milking of said dairy animals supported on said first level.

14. A method of routing milk in a milking facility comprising the steps of:
    positioning a dairy animal on a platform at a first, uppermost elevation;
    attaching a milk claw and teat cups to the udder of the dairy animal positioned at said first, uppermost elevation;
    milking said dairy animal;
    conveying the milk from the milk claw to a milk conduit at a second, intermediate level;
    routing the milk from the conduit to a weigh meter at a third, lower level positioned beneath said first elevation and environmentally isolated from said first elevation and said second level.

15. A method as set forth in claim 14 including the step of conveying the milk from the milk meter through a pipeline to a milk receiver at a fourth, lowermost level.

* * * * *

UNITED STATES PATENT AND TRADEMARK OFFICE
CERTIFICATE OF CORRECTION

PATENT NO. : 5,361,722
DATED : November 8, 1994
INVENTOR(S) : Joe Tecza

It is certified that error appears in the above-indentified patent and that said Letters Patent is hereby corrected as shown below:

On the title page, item [75], after the words "Inventor: Joe Tecza, Platte City, Mo.", the following two inventors should be added:

-- Eugene E. Norwood, Goldwaite, Tx.
John Uryga, Kansas City, Mo. --

Signed and Sealed this

Thirteenth Day of June, 1995

*Attest:*

BRUCE LEHMAN

*Attesting Officer*    *Commissioner of Patents and Trademarks*